United States Patent [19]

Jambor

[11] Patent Number: 5,346,341
[45] Date of Patent: Sep. 13, 1994

[54] AUTOMATIC CHIP REMOVAL SYSTEM FOR SIGN ENGRAVING MACHINE

[75] Inventor: George F. Jambor, Cedarburg, Wis.

[73] Assignee: Brady USA, Inc., Milwaukee, Wis.

[21] Appl. No.: 25,012

[22] Filed: Mar. 2, 1993

[51] Int. Cl.⁵ .......................... B23C 3/00; B23Q 11/02
[52] U.S. Cl. ............................ 409/132; 29/DIG. 83;
                                          408/67; 409/137
[58] Field of Search ............................ 409/137, 132;
                                  29/DIG. 82, DIG. 83; 408/56, 67, 68

[56] References Cited

U.S. PATENT DOCUMENTS

| | | |
|---|---|---|
| Re. 4,886 | 4/1972 | Gear . |
| 1,237,034 | 8/1917 | Kunitz . |
| 1,386,539 | 8/1921 | Strock .......................... 29/DIG. 83 |
| 1,923,159 | 8/1933 | McLarch .......................... 409/137 X |
| 2,236,232 | 3/1941 | Brescka et al. ...................... 183/38 |
| 2,359,931 | 10/1944 | Moffitt .................................. 90/14 |
| 2,944,465 | 7/1960 | Jones .............................. 409/137 |
| 3,167,260 | 1/1965 | Gibbons et al. ............... 409/137 X |
| 3,340,915 | 9/1967 | Passer ................................ 145/116 |
| 4,244,669 | 1/1981 | Puritz et al. .......................... 409/137 |
| 4,340,326 | 7/1982 | Buonaurd et al. .............. 409/137 X |
| 4,738,571 | 4/1988 | Olson et al. .......................... 409/137 |
| 4,915,550 | 4/1990 | Arai et al. .............................. 408/56 |
| 4,921,375 | 5/1990 | Famulari ................................ 408/67 |
| 5,017,060 | 5/1991 | Shiratori et al. ..................... 409/137 |
| 5,176,478 | 1/1993 | Munch ................................. 409/137 |

FOREIGN PATENT DOCUMENTS 0185343 7/1990 Japan ..................... 409/137

Primary Examiner—Z. R. Bilinsky
Attorney, Agent, or Firm—Quarles & Brady

[57] ABSTRACT

A chip removal method and apparatus for a sign engraving machine. The method involves engraving a sign blank in such a manner that chips fall from a cutting region on the sign blank into an enclosure, and swirling the chips in the enclosure so that the chips exhaust through an opening in the periphery of the enclosure and eventually pass through a chute into a receptacle. The apparatus is a guide member located parallel to an outer envelope of the volume that can be occupied by a rotating cutting head of the engraver. The guide member has a surface for contacting the sign blank. The contact surface has an access opening at its center to allow chips to enter the guide member from a cutting region on the sign blank. The guide member tapers away from the cutting region and has an exhaust opening and chute for exhausting the chips. The guide member is used with a rotating cutting head that propels chips circumferentially and allows them to be exhausted through the chute.

11 Claims, 4 Drawing Sheets

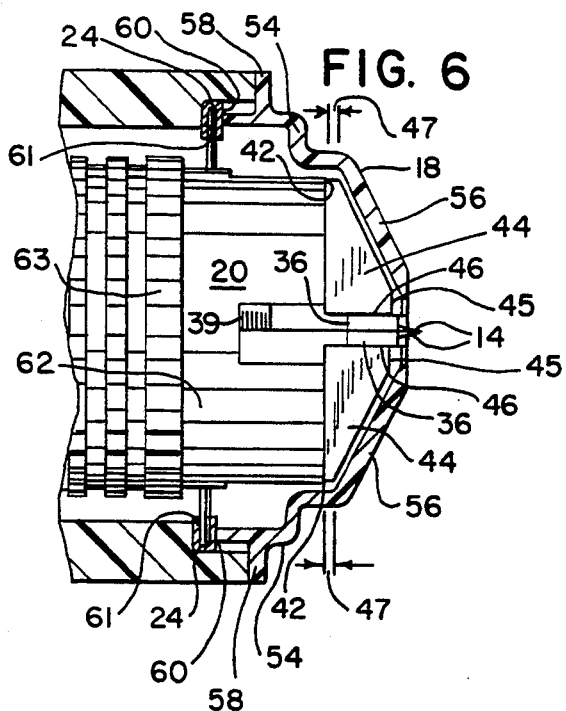
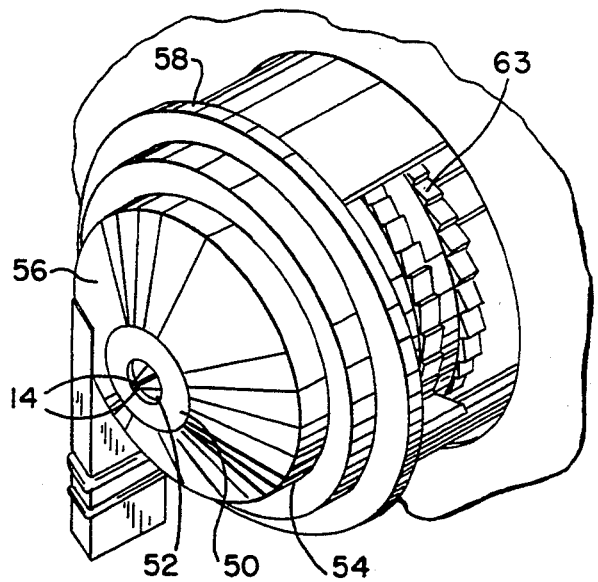
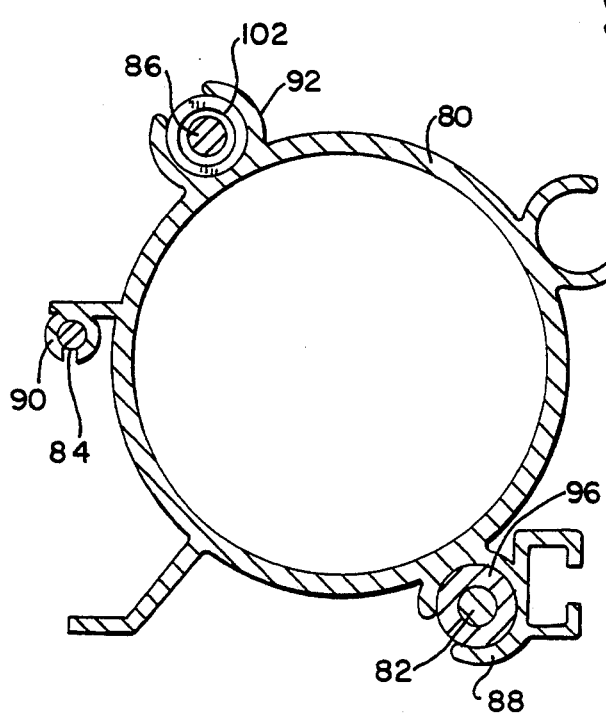

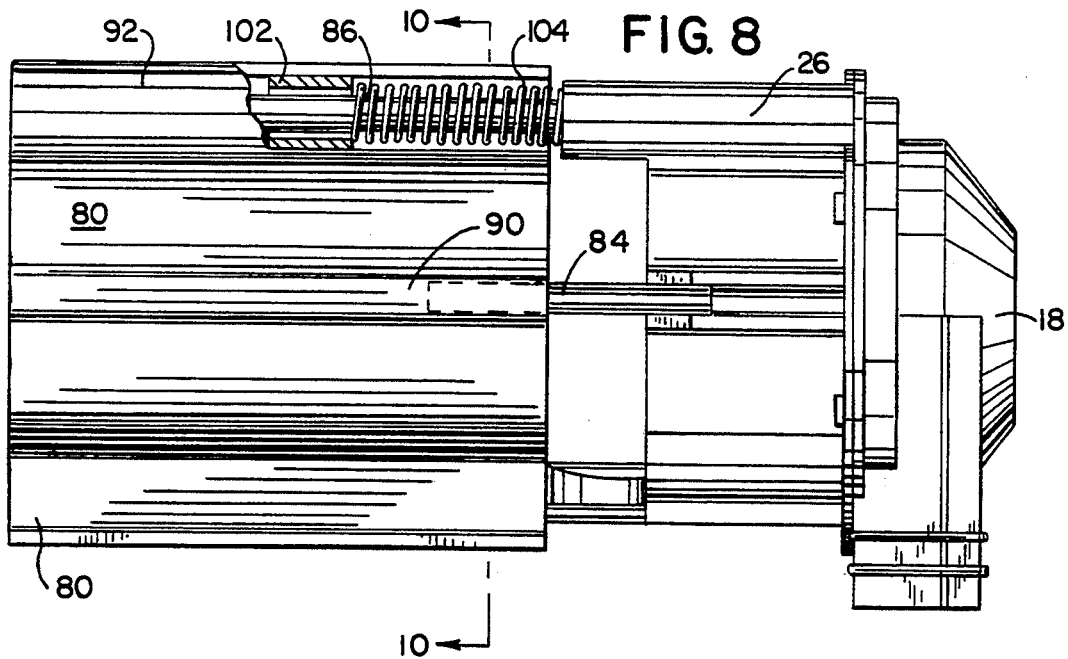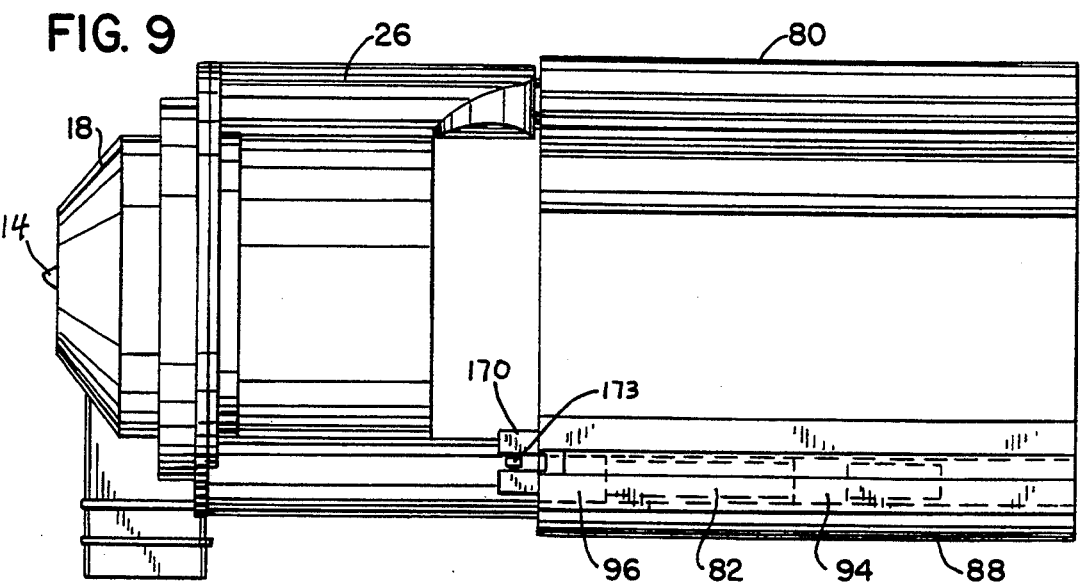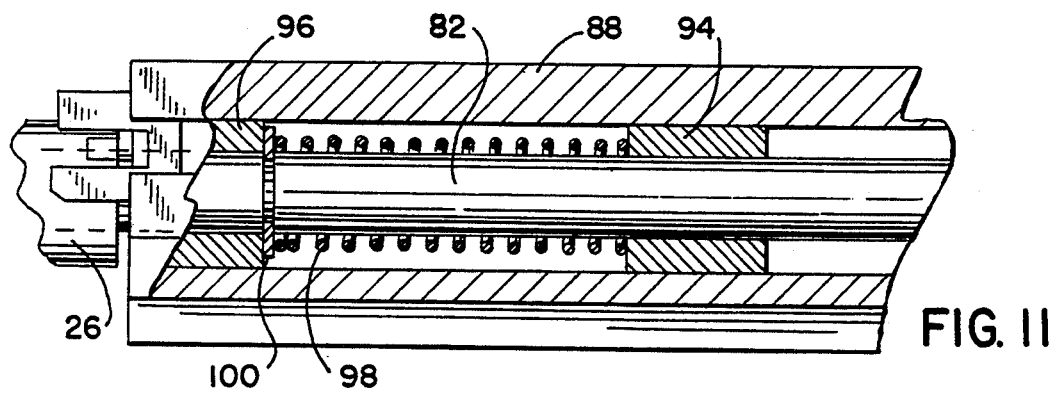

AUTOMATIC CHIP REMOVAL SYSTEM FOR SIGN ENGRAVING MACHINE

FIELD OF THE INVENTION

The present invention relates to mechanical sign engraving machines. In particular, the invention relates to a method and apparatus for removing chips generated when such machines operate to engrave signs.

BACKGROUND OF THE INVENTION

Mechanical sign engravers typically engrave with engraving or cutting tips attached to a cutting head or chuck rotating at very high speeds—about 10,000 RPM. Engraving begins by plunging the rotating cutting tips into a surface of a sign blank. After the cutting tips have been plunged into the surface of the sign blank, the rotating tips are moved along the surface of the sign blank to engrave a design (i.e. letters, numbers, symbols, or the like). To engrave a design that is not continuous with the previous engraved design, the cutting head is typically retracted to remove the cutting tips from the sign blank, moved to a next location, and unretracted to plunge the cutting tips into the sign blank at the next location.

Chips are generated as the cutting tips rotate and engrave or chip away the desired design in the sign blank. The very high rotational speed of the engravers creates a need for engravers to have effective chip removal systems so that the workplace can remain clean, and so that the engravers may operate without interruptions for clearing chips.

Sign blanks can be made out of various materials including metal, plastic, and wood. A chip removal system should be able to accommodate these various materials. A chip removal system should also be able to accommodate variations in chip size and chip weight because chip size and weight can vary with the type of cutting tip, the engraving depth, and the material of the sign blank.

Prior art chip or debris removal systems have used air flows or vacuums to blow or suck chips away from the cutting region and through a chute or hose into a collection receptacle, such as a cannister. These systems use mechanical fans or vacuums and are expensive and bulky. Typically, these kinds of chip removal systems (such as U.S. Pat. No. 4,915,550, which is for a printed circuit board drill rather than an engraver) have a glider (or pressure foot) surrounding a rotating cutting tool. The glider has an opening through which the cutting tool extends into the workpiece and through which chips, dust, or other debris are blown or drawn by vacuum into the glider. The debris is then blown or sucked out of the glider through a chute leading to a hose and eventually to a collection receptacle. In such systems, the hose is usually long to allow debris to be sufficiently removed from the cutting region so debris does not interfere with the cutting of the workpiece (i.e. sign blank). The long hoses tend to clog easily.

As noted above, chips generated during sign engraving can vary from small, light plastic chips to larger, heavier metal chips. Present chip or debris removal systems are not especially well-suited for mechanical sign engraving because the very large air flows needed to move the large, heavy chips away from the cutting region into a glider, and out of the glider through a hose into the collection receptacle, require expensive fans or vacuums. Such fans and vacuums add significantly to the cost of sign engravers. The cost of fans or vacuums is especially excessive when only small, light chips need to be moved.

It can therefore be appreciated that an improved chip removal system which does not depend upon expensive fans or vacuums to move chips is desirable.

SUMMARY OF THE INVENTION

The present invention is a method and apparatus for removing engraving chips without the need for vacuums or fans. The present invention, therefore, alleviates the aforementioned problems associated with current chip removal systems.

In one aspect, the present invention provides a method for removing chips produced by a machine for engraving a sign blank of the type using a cutter on a rotating cutting head to engrave a cutting region on the sign blank. The method involves orienting an axis of rotation for the cutter where the axis is closer to horizontal than vertical, feeding the sign blank in close proximity to the cutter, engraving the sign blank by generating chips that fall from the cutting region into an enclosure, swirling the chips in the enclosure so that the average chip velocity has a substantial circumferential component around the axis of rotation of the cutter, exhausting the swirling chips in the enclosure through an exhaust opening in the enclosure and through a chute aiming downward from the enclosure, and collecting the chips exhausting through the chute in a receptacle.

In another aspect, the present invention provides an apparatus, referred to herein as a guide member, for guiding chips along a path for removal from the cutting region. The guide member is used for removing chips generated by a machine using a cutter on a rotating cutting head for engraving a sign blank. The guide member has a contact surface forming a flat, central face for contacting the sign blank. The contact surface has an access opening at its center for allowing chips to enter the guide member from a cutting region on the sign blank. The guide member also has a ramped wall of increasing diameter extending radially from the contact surface and receding from the cutting region. The ramped wall is parallel to an outer envelope of the volume that can be occupied by the rotating cutting head. It is preferred that the ramped wall be in the shape of a partial conical shell. A gutter wall having an exhaust opening is located at the periphery of the ramped wall. A swirling volume is formed between the guide member and the cutting head. An exhaust chute depends from the guide member at a tangent from the gutter wall. Swirling chips pass through the exhaust opening in the gutter wall and exhaust through the chute to the exterior of the guide member.

In yet another aspect, the apparatus of the present invention can be considered to be a sign engraving machine which embodies a cutting head of particular design and a guide member in an exhaust system.

A primary object of the present invention is to provide a chip removal system that does not require air flows created by an additional apparatus such as a vacuum system or a fan to move chips away from a cutting region.

Other objects of the present invention include:
providing a chip removal system which does not interfere with the motion of the sign blank;
providing a chip removal system with a chute or hose that does not tend to clog;

providing a chip removal system that catches chips generated when plunging rotating cutting tips on the cutter head into the sign blank; and providing a quieter sign engraving machine by removing the need for vacuum or fan systems and their associated noise.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiment illustrated in greater detail in the accompanying drawings and described below by way of an example of the invention.

In the drawings:

FIG. 6 is a view similar to FIG. 5 except a cutting head of the apparatus is rotated 90°;

FIG. 7 is a perspective view of the preferred embodiment of the apparatus of the present invention;

FIG. 8 is a side elevational view of the right side of the apparatus of the present inventions used to mount the guide member;

FIG. 9 is a side elevational view of the left side of the apparatus shown in FIG. 8;

FIG. 10 is a cross-sectional view taken along line 10—10 in FIG. 8; and

FIG. 11 is a detailed view of a spring-loading mechanism shown in phantom in FIG. 9.

While the invention will be described in connection with the preferred embodiment, it will be understood that I do not intend to limit the invention to that embodiment. On the contrary, I intend to cover all alternatives, modifications, and equivalents within the spirit and scope of the invention.

DESCRIPTION OF THE PREFERRED EMBODIMENT

Figure 1:
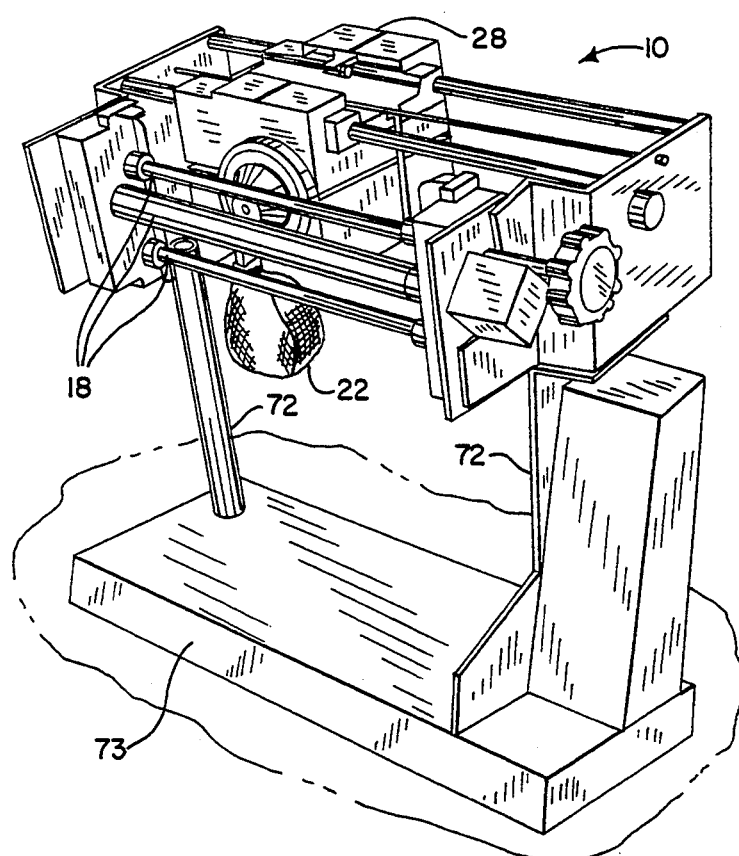
FIG. 1 is a perspective view of a sign engraving machine embodying the preferred embodiment of the present invention.
Figure 2:
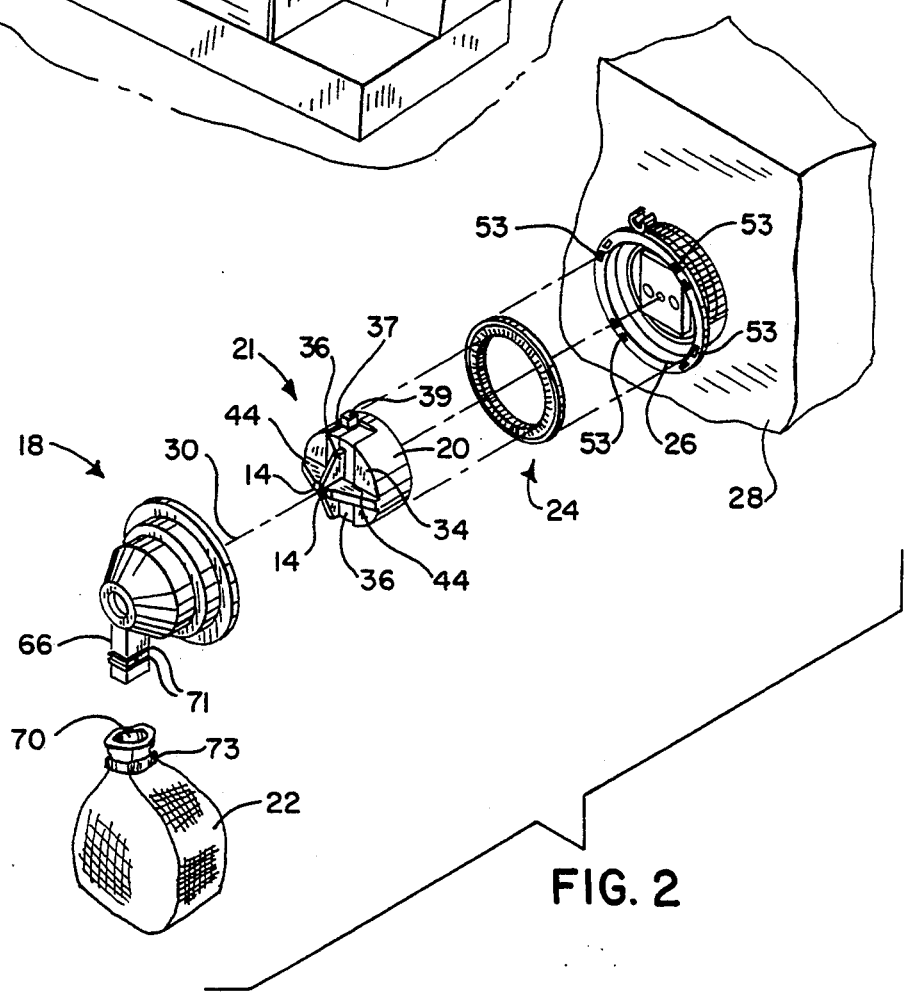
FIG. 2 is an exploded perspective view showing the apparatus of the preferred embodiment of the present invention.

The preferred embodiment of the present invention is a system to remove chips generated by a mechanical sign engraver 10 as illustrated in FIG. 1. Generally speaking, the components of the preferred chip removal system are shown in FIG. 2 and include: a guide member 18, a rotating cutter head assembly 21, a chip receptacle bag 22, a brush seal 24, and an adapter 26 for connecting the system to a movable extrusion 80 (see FIGS. 8-10) in a drive casing 28.

Figure 3:
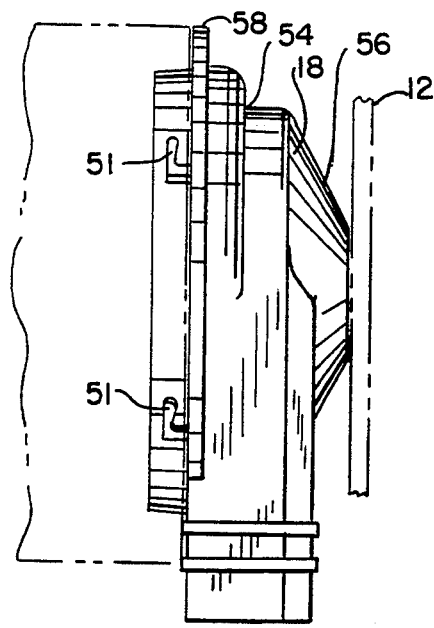
FIG. 3 is a detailed side elevational view of a preferred embodiment of a guide member of the present invention.

Referring to FIG. 1, the mechanical sign engraver 10 engraves a design into a sign blank 12 (shown in FIG. 3) when cutting tips 14 (best shown in FIG. 7) are rotated at a very fast speed (e.g. about 10,000 RPM) and plunged into the sign blank 12. A desired design is engraved into the sign blank 12 by moving plunged cutting tips 14 along the sign blank 12.

For purposes of the present description, it is sufficient to understand that the cutter head assembly 21 is rotated at a specified rpm (revolutions per minute) by a spindle motor, as the cutting tips 14 are moved transversely by an X-axis motor and drive mechanism. This results in a cutting action in which overlapping circular cuts define the width of a line which is engraved in the sign blanks 12. For further descriptions of the cutter head assembly 21, and the sign engraving machine 10, reference is made to a copending U.S. patent application of Jambor, entitled "Method and Apparatus for Adjusting Line Width in a Sign Engraving Machine" and filed on even date herewith.

The sign blank 12 is supported in a support plane by support bars 18. The cutting tips 14 can be moved along the support plane to carve a design in the sign blank 12, and also moved perpendicular to the support plane to plunge and retract the cutting tips 14. Chips are generated in a cutting region as the cutting tips 14 engrave the sign blank 12.

The chip removal system of the present invention preferably uses the same rotation to remove chips from the cutting region as the machine 10 uses to rotate the cutting tips 14 for engraving a sign blank 12. Referring to FIG. 2, the cutter head assembly 21 rotates about an axis 30. The cutter head assembly 21 is generally cylindrical and includes a chuck head 20, cutter inserts 36, and holders 37 which lock the cutter inserts 27 to the chuck head 20. The chuck head 20 has a front face 34 which is perpendicular to the axis 30 of rotation.

Figure 5:
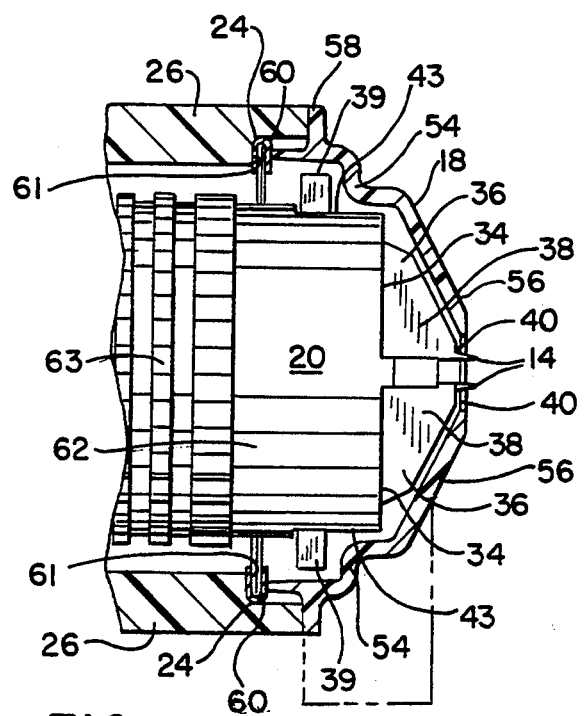
FIG. 5 is a side elevational view of the apparatus of the preferred embodiment of the present invention with the guide member shown in section.

Two cutter inserts 36 are releasably attached to the front face 34 of the chuck head 20. As shown in FIG. 5, each cutter insert 36 has a body portion 38 and a cutting tip 14. The cutter inserts 36 are releasably locked into the chuck head 20 in a position orthogonal to the front face 34 by a pair of mechanical spring-loaded holders 37. The holders 37 are released using buttons 39 located on the peripheral wall 43 of the chuck head 20. The bodies 38 of the cutter inserts 36 are highest (i.e. project farthest from the front face 34) at a region 40 that is disposed near the axis 30 of rotation. The height of the body 38 tapers as the body extends radially from the high region 40 towards a peripheral edge 42 of the chuck head 20. The cutting tips 14 are also centrally disposed near the axis 30 of rotation and protrude beyond the high region 40 of the body 38.

Referring to FIG. 6, the chuck head 20 has two wings 44 that extend perpendicularly from the front face 34. The wings 44 are located such that they are perpendicular to the cutter inserts 36 and rotate about the axis 30 of rotation. The wings 44 each have an inner stabilizing wall 46 that provides lateral support to the cutter inserts 36 so that the cutting tips 14 are stable. The height of the wings 44 from the front face 34 of the cutting head 20 is highest at a centrally disposed region 45 near the inner stabilizing wall 46. The height of the wings 44 remains constant for a short distance as the wings 44 extend radially outward. The maximum height of the wings 44 is slightly less than the height of the high region 40 on the cutter blades 38. The height of the wings 44 tapers at a constant slope as the wings 44 extend radially from region 45 to a peripheral edge 42 of the cutting head 20. At the peripheral edge 42, the wings 44 extend from the front face 34 an edge height 47.

The distance that the high regions 45 of the wings 44 remain at a constant height corresponds generally to a diameter 48 of a front contact surface 50 of the guide member 18.

For further description of cutter inserts 36, the holders 39, and the chuck head 20, reference should be made to a copending U.S. patent application of Jambor entitled "Cutter Inserts for Sign Engraving Machine" and filed on even date herewith.

The guide member 18 is made of molded plastic (delrin), but other materials may be suitable. The guide member 18 is mounted to the adapter 26 by inserting locking barbs 51 on the guide member 18 (shown in FIG. 3) into ports 53 in the adapter 26 (shown in FIG. 2). The mounted guide member 18 encloses an envelope defined by the volume which can be occupied by the rotating chuck head 20.

In particular, when the chuck head 20 is rotated, the cutter inserts 36 and cutter wings 44 spin through a region referred to as a cutting envelope, which is bounded by the edges of the cutter wings 44 which project furthest from the face of chuck head 20 (except very close to the axis 30 of rotation). The ramped wall 56 of guide member 18 is parallel to and spaced closely from the edges of cutter wings 44.

Referring to FIG. 7, the front contact surface 50 of the guide member 18 is circular. It has a circular access hole 52 disposed through its center around the axis 30 of rotation. The diameter of the access hole 52 is about 0.28 inches, which is large enough to allow free rotation of the cutting tips 14 when they are spread apart at the maximum allowed distance. The contact surface 50 is flat and perpendicular to the axis 30 of rotation. A flat sign blank 12 in the support plane interfaces the contact surface 50 intimately (see FIG. 3). When the cutter head assembly 21 is moved axially forward, the cutting tips 14 protrude through the access hole 52 and plunge into the sign blank 12.

Figure 4:
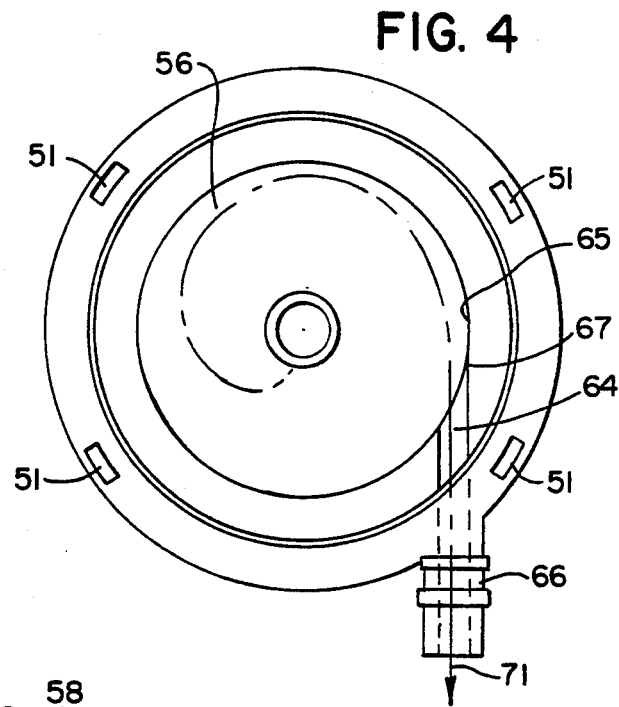
FIG. 4 is a bottom plan view of the guide member shown in FIG. 3.

Referring in particular to FIGS. 4 and 6, the guide member 18 has a terraced gutter wall 54 that is located slightly beyond the peripheral edge 42 of the cutting head 20. It is useful in this embodiment to terrace the gutter wall 54 because the buttons 39 for securing the cutter inserts 36 project radially from the peripheral wall 43 of the chuck head 20. The gutter wall 54 is terraced to provide a relatively close clearance between the peripheral wall 43 (and buttons 39) of the rotating cutting head assembly 21 and the guide member 18.

A ramped wall 56 connects the contact surface 50 to the gutter wall 54. The ramped wall 56 is in the shape of a partial-conical shell. The ramped wall 56 is substantially parallel and relatively close to the envelope of the rotating wings 44 on the chuck head 20. The clearance gap between the rotating wings 44 and the guide member 18 is preferably 0.001 inches or greater. This gap is important so chips are not wedged between the rotating wings 44 and the guide member 18. Wedged chips could be destructive to the guide member 18. Chips that are missed because of the gap are simply propelled by a following cutter insert 36 or wing 44.

A flange 58 extends radially from the terraced gutter wall 54. The locking barbs 51 are located on the side of the flange 58 opposite the contact surface 50 and towards the adapters 26 (see FIG. 3). The guide member 18 is secured to the adapter 26 by inserting locking barbs 51 into ports 53 on adapter 26. A brush seal 24 is provided to retard chips from flowing into the casing 28. The brush seal 24 has an annular frame and bristles which extend radially inward from the frame. The brush seal 24 is located about the peripheral wall 43 of the body 62 of the chuck head 20. The brush seal 24 is held in place when the guide member 18 is secured to the adapter 26 by sandwiching the seal 24 between the rear edge 60 of the gutter wall 54 and a ledge 61 of the adapter 26.

Referring again to FIG. 7, a portion of the adapter 26 is cut away to allow access for mechanical adjustment of indexing gears 63. The indexing gears 63 are used to adjust the spread distance between cutting tips 14. Note that the brush seal 24 is located around the body 62 of the cutting head 20 in an axial position where a portion of the adapter 26 is not cut away.

When the machine 10 operates to engrave a sign blank 12, the cutting tips 14 are plunged into the sign blank 12 and generate chips as a by-product. The chips fall naturally into the volume enclosed by the envelope of the rotating wings 44 and the cutter inserts 36. The fallen chips are impacted (possibly repeatedly) either by a wing 44 or an insert 36 (or both), and centrifugal action causes the chips to swirl throughout the volume. The motion of each individual chip is somewhat random, but eventually, all the chips migrate towards the gutter wall 54 of the guide member 18. Near the gutter wall 54, the average chip velocity has a substantial circumferential component.

Referring to FIG. 4, the gutter wall 54 has an exhaust opening 64 that begins at a point 67 where a tangent line drawn to the inside surface 65 of the gutter wall 54 is substantially vertical when the guide member 18 is secured to the adapter 26. Note also that a portion of the exhaust opening 64 extends through an adjacent portion of the ramped wall 56.

The guide member 18 has a chute 66 for receiving chips exhausted through the opening 64. The chute 66 depends vertically from the gutter wall 54 and from the ramped wall 56 at the location of the exhaust opening 64. The swirling chips which have migrated towards the gutter wall 54 can pass through the exhaust opening 64 and exhaust through the exhaust chute 66. This is illustrated in FIG. 4 where swirling chips are shown to pass through the opening 64 and the chute 66 in the direction of arrow 71.

The primary flowpath of swirling chips through the exhaust opening 64 is postulated to be a path flowing through height 47 corresponding to the peripheral edge of the wings 44. The exhaust opening 64 is larger than the postulated primary flowpath to reduce clogging. As noted above, the opening 64 extends through an adjacent portion of the ramped wall 56. Also note that the exhaust opening 64 extends inward (i.e. towards adapter 26) along the terraced gutter wall 54 to allow chips which have been forced around the peripheral wall 43 of the rotating chuck head 20 to exhaust easily.

Referring to FIGS. 1 and 2, chips exhausting through the chute 66 are collected in a chip receptacle bag 22. The receptacle bag 22 is fastened to the chute 66 by extending the chute 66 through hole 70 in the bag 22, and tightening the bag 22 around the chute 66 with an elastic 73 or equivalent retaining device. Two ribs 71 are provided on the chute 66 to keep the bag 22 from slipping and to improve the seal of the bag 22 around the chute 66.

Since the chute 66 is offset away from the plane in which the sign blank 12 is supported, the receptacle bag 22 can be mounted so that it does not interfere with movement of the sign blank 12. This can be done by hooking the bag 22 to the underside of the casing 28, or by using wire inside the bag 22 to support the bag 22 away from the plane in which the sign blank 12 is supported. Mounting the receptacle bag 22 directly beneath the casing 28 allows for the chute 66 to be relatively short (e.g. 1 to 2 inches). This helps reduce the tendency of the chute 66 to clog.

Referring to FIGS. 8 through 11, the adapter 26 is preferably spring-loaded in its attachment to the movable extrusion 80 for limited axial movement with respect to the chuck head 20 (i.e. 0.045 inch total movement). By spring loading the adapter 26, the guide member 18 is pushed forward beyond its normal operating position in the direction towards the sign blank 12 when the cutting tips 14 are not plunged into a sign blank 12. As the cutting head 20 is displaced axially towards a sign blank 12 to plunge the cutting tips 14 into the sign blank 12, the contact surface 50 of the guide member 18 contacts the sign blank 12 before the cutting tips 14. The contact surface 50 of the guide member 18 remains in contact with the sign blank 12 as the cutting tips 14 plunge into the sign blank 12. In this manner, chips generated while the cutting tips 14 are plunging into the sign blank 12 naturally fall into the chip removal system instead of to the environment.

It is important that the spring-loaded attachment of the adapter 26 to the extrusion 80 be precise so that the rotating chuck head assembly 21 does not contact the guide member 18 or the adapter 26. The preferred spring-loaded attachment assembly uses three rods to accomplish the required precision: a precision-fit attachment rod 82, a precision-fit rotation prevention rod 84, and a loose-fitting spring pressure equalization rod 86. Each of these rods 82, 84, and 86 are supported directly or indirectly by the extrusion 80 and extend into attachment ports in the adapter 26 which accept the rods. The precision-fit attachment rod 82 is the primary rod for the spring-loading mechanism, whereas rods 84 and 86 are primarily responsible for maintaining precision.

Referring in particular to FIG. 10, the extrusion 80 is formed to have receptacle grooves 88, 90, and 92, which each have a C-shaped cross-section and travel longitudinally along the extrusion 80. Groove 92 is preferably 180° around the extrusion 80 from groove 88.

Referring in particular to FIGS. 9 and 11, bushings 94 and 96 are pressure fit into groove 88. The rod 82 is precision fit through bushings 94 and 96. A spring 98 and a retainer ring 100 are located around the rod 82 between the bushings 94 and 96. The retainer ring 100 fits tightly around the rod 82 and interferes with bushing 96 so that the rod 82 cannot slide through bushing 96 beyond the ring 100. The spring 98 exerts a spring pressure between bushing 94 and ring 100 so that the ring 100 abuts bushing 96 when no opposite pressure exist. When the contact surface 50 of the guide member 18 contacts a sign blank 12, the spring is compressed.

As seen in FIG. 9, a depth control optical sensor 170 is positioned at the front corner of the motor carrier extrusion 80. A finger 173 formed on adapter 26 moves with the guide member 18 to interrupt an optical beam provided by sensor 170. This cutter depth sensor 170 senses the relation of the cutter tips 14 to the contact surface 50 of the guide member 18. In the "pen up" position, the beam is interrupted. As the cutter tips 14 are plunged to engraving depth, the beam is cleared, which sends a signal to an electronic control to de-energize a Z-axis drive with the cutter tips 14 at engraving depth. The length of travel from the "pen up" to the full plunge or "engraving" position is approximately 0.40 inches. The cutter tips 14 are then driven in transverse direction (X-axis) or the sign blank is moved upward (Y-axis) relative to the cutter tips 14 to provide two-dimensional engraving on the sign blank.

Referring in particular to FIGS. 8 and 10, rod 84 is precision fit into groove 90. The purpose of rod 84 is to prevent the adapter 26 from rotating around rod 82. Such a rotation around rod 82 would result in the adapter 26 and/or the guide member 18 interfering with the rotating cutter head assembly 21, or other rotating parts.

Bushing 102 is located in groove 92 to support rod 86. It is not necessary for rod 86 to be precision fit in bushing 102. A spring 104 is located around rod 86 between the bushing 102 and the adapter 26. The spring 104 exerts pressure on the adapter 26 so that pressure from spring 98 does not tilt the adapter 26, and ultimately the guide member 18.

Referring again to FIG. 1, it can be seen that the engraver 10 is supported on a base 73 by machine supports 72. The machine 10 is supported so that the supporting plane is tilted slightly from a vertical position. This is done so an operator of the machine 10 can more easily view the engraving process. Specifically, the supporting plane is substantially orthogonal to the axis of rotation of the chuck head 20, and the axis 30 of rotation of the chuck head 20 is, in this preferred embodiment, 16° below horizontal. Note, however, that the machine 10 and the associated chip removal system will work effectively as long as the supporting plane is oriented such that engraving chips would fall or be blasted naturally into the volume enclosed by the guide member 18. This may be accomplished in other ways, but one way is to orient the supporting plane closer to a vertical plane than a horizontal plane.

While a particular embodiment of the invention has been shown, it will be understood, of course, that the invention is not limited thereto since modifications may be made by those skilled art, particularly in light of the foregoing teachings.

I claim:

1. A method for removing chips produced by a machine for engraving a sign blank of the type using a cutter on a rotating cutting head to engrave a line on the sign blank, the method comprising:
   orienting an axis of rotation for the cutter closer to horizontal than to vertical;
   feeding the sign blank in a path in close proximity to the cutter;
   engraving the sign blank by generating chips that fall from the cutting region into an enclosure having an exhaust opening into a chute that is aimed downward from the enclosure;
   moving the chips in a circumferential direction through rotation of the cutter on the cutter head so that the average chip velocity has a substantial circumferential component around an axis of rotation of the cutter; and
   directing the chips into the exhaust opening and through the chute, without the use of auxiliary devices such as fans, blowers or vacuum generators, where the chips are allowed to fall downward and out of the enclosure.

2. A method as recited in claim 1 wherein the exhausting step is performed by exhausting the chips downward through a chute and along a path that is tangent to a circular path around the axis of rotation of the cutter.

3. A guide member for removing chips generated by a machine using a cutter on a rotating cutting head for engraving a sign blank, the guide member comprising:
a contact surface forming a circular, flat central face for contacting the sign blank, the contact surface having an access opening at the center thereof for allowing chips to enter the guide member from a cutting region on the sign blank;
a ramped wall of increasing diameter extending radially from the contact surface and receding from the cutting region, wherein the ramped wall is parallel to an outer envelope of the cutting head;
a gutter wall having an exhaust opening and located at the periphery of the ramped wall;
an exhaust chute depending from the guide member at a tangent from the gutter wall for receiving swirling chips that pass through the exhaust opening and exhaust such chips to the exterior of the guide member.

4. The guide member as recited in claim 3, further comprising:
a spring-loaded adapter for mounting the guide member for yieldable movement relative to the cutter head so that the contact surface contacts the sign blank before the cutter and captures the first chips cut from the sign blank.

5. A machine for engraving a sign blank comprising:
a movable frame;
a sign support for supporting the sign blank in a support plane that is oriented so that engraving chips fall from a cutting region on the sign blank;
a cutting head mounted to the movable frame for axial movement along and rotation around a rotation axis that is substantially orthogonal to the support plane;
the cutter head having a plurality of projecting members with outer edges that taper and recede from the axis of rotation to a periphery of the cutting head;
wherein the projecting members and the periphery of the cutting head define an envelope as the cutting head rotates; and
a guide member mounted to the frame which is spaced from the envelope, and enclose the envelope and form a chip swirling volume into which chips generated by engraving the sign blank naturally fall, the guide member having
a contact surface having an access opening through which the cutting tip protrudes to engrave the sign blank,
a gutter wall having an exhaust opening located slightly beyond the peripheral edge of the face of the cutter head,
a ramped wall connecting the contact surface to the gutter wall, the ramped wall being parallel to the envelope of the rotating cutting head, and
an exhaust chute depending from the gutter wall to exhaust chips flowing through the exhaust opening;
wherein the projecting members rotate when the machine is engraving and deflect chips in the swirling volume so that centrifugal and normal forces cause the chips to swirl, migrate towards the gutter wall, and eventually pass through the exhaust opening in the gutter wall and exhaust through the exhaust chute.

6. A machine as recited in claim 5 further comprising:
a receptacle for receiving chips exhausted through the chute, wherein the receptacle has an opening for receiving the chute.

7. A machine as recited in claim 5 wherein the exhaust chute from the guide member depends from the gutter wall in a substantially vertical direction and is tangent to the gutter wall at the exhaust opening.

8. A machine as recited in claim 5, further comprising
an adapter for mounting the guide member to the movable frame;
means for mounting the guide member to the adapter; and
a brush seal for sealing around the periphery of the cutter head, the brush seal being captured between the adapter and the rear edge of the guide member.

9. A machine as recited in claim 8 wherein the adapter is spring-loaded so that axial movement of the guide member along the rotation axis is yieldable relative to the cutter head.

10. A method for removing chips produced in a machine of the type using a cutter in a rotating cutting head for engaging a sign blank to provide a cutting region on the sign blank, the method comprising:
orienting an axis of rotation for the cutter closer to horizontal than to vertical relative to a supporting surface for the machine;
orienting the feed path for the sign blank in an upward direction relative to the supporting surface for the machine;
propelling the chips through rotation of the cutter head along a helical path within an enclosure which surrounds the cutter and the cutting region, such that the chips are directed into a chute without the use of auxiliary devices such as fans, blowers or vacuum generators; and
exhausting the chips downward toward the supporting surface through the chute along a path that is tangent to the helical path.

11. The method of claim 10, further comprising the step of collecting the chips in a receptacle communicating with an exit end of the chute.

* * * * *